C. R. Rand,
Grain Drill.
No. 111,871. Patented Feb. 14, 1871.

Witnesses:
Phil. T. Dodge
Harry King

Inventor:
Chas. R. Rand,
by Dodge & Munn
Attys.

C. R. Rand,
Grain Drill.
No. 111,871. Patented Feb. 14, 1871.

C. R. Rand,
Grain Drill.
No. 111,871. Patented Feb. 14, 1871.

Witnesses:
T. C. Brecht.
Phil. T. Dodge

Inventor:
Chas. R. Rand.
by Dodge Munn
Attys.

C. R. Rand,
Grain Drill.
No. 111,891. Patented Feb. 14, 1871.

Witnesses:
T. E. Brecht
Phil T. Dodge

Inventor:
Chas R. Rand.
by Dodge & Munn
Attys

C. R. Rand,
Grain Drill.
No. 111,871. Patented Feb. 14, 1871.
Fig. 9.
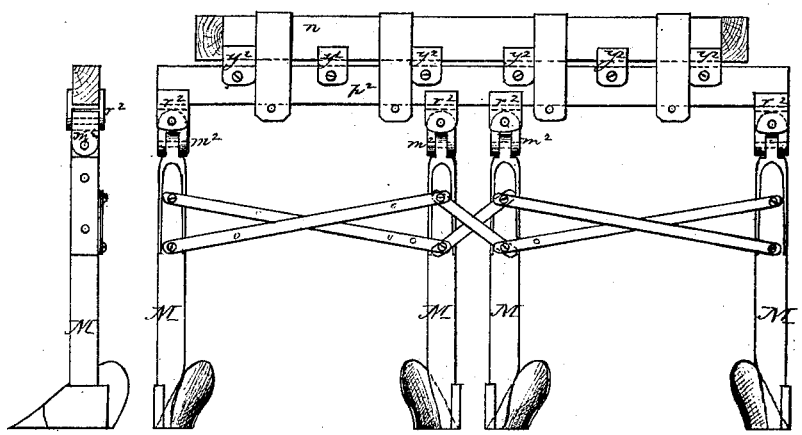
Fig. 10.  Fig. 11.
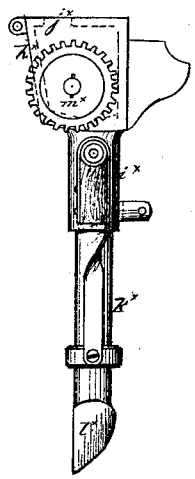 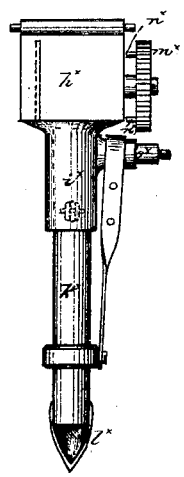
Witnesses:
T. C. Brecht.
Phil. T. Dodge.
Inventor:
Chas. R. Rand,
by Dodge & Munn
Attys.

United States Patent Office.

CHARLES R. RAND, OF DUBUQUE, IOWA.

Letters Patent No. 111,871, dated February 14, 1871.

IMPROVEMENT IN COMBINED AGRICULTURAL IMPLEMENTS.

The Schedule referred to in these Letters Patent and making part of the same.

*To all whom it may concern:*

Be it known that I, CHARLES R. RAND, of Dubuque, in the county of Dubuque and State of Iowa, have invented certain Improvements in Combined Agricultural Implements, of which the following is a specification, reference being had to the accompanying drawing.

My invention relates to a combined agricultural implement, and consists in a wheeled frame, and various interchangeable devices which may be connected thereto, whereby the machine may be converted at will into a corn-planter, corn-drill, grain-drill, hay-rake, hay-tedder, cultivator, gang-plow, or a potato-digger.

Figure 7:
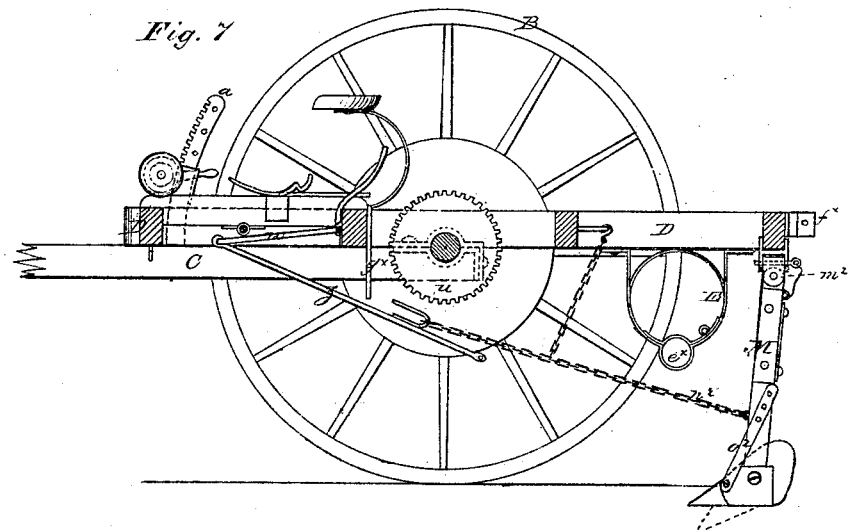
Figure 8:
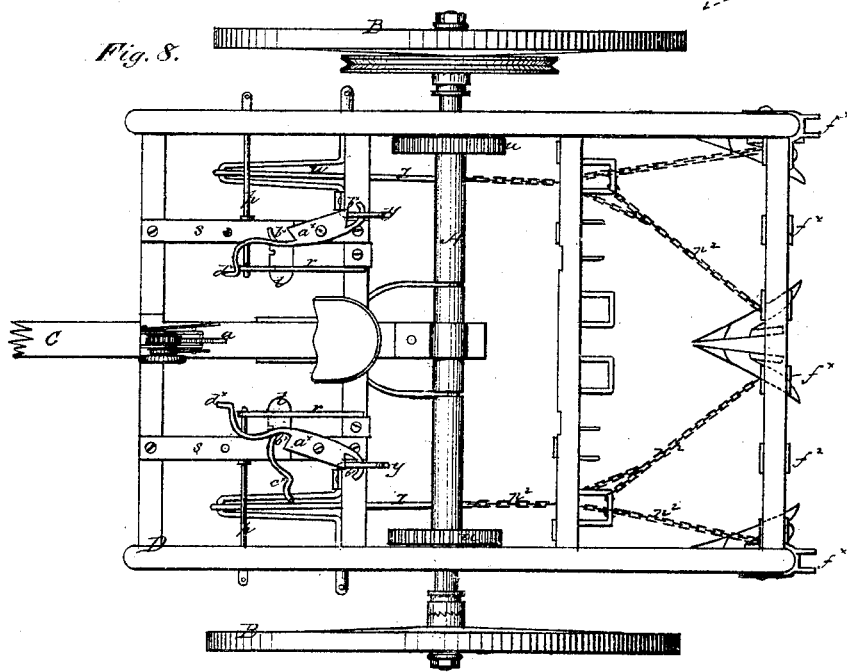

Figures 7, 8, and 9 are respectively a longitudinal section, a top plan, and a rear elevation of the machine arranged as a cultivator or corn-plow; and Figures 10 and 11 are a side and a back view of one of the teeth used when planting corn.

In proceeding to construct my machine I first provide a shaft or axle, A, and mount loosely on each end thereof a large wheel, B, so that it can turn freely thereon but cannot move laterally.

To the middle of shaft A I attach, by means of suitable boxes, the rear end of a tongue or draft-pole, C, the axle being left free to turn in the boxes while the tongue is prevented from moving sidewise on the axle.

On the shaft A I mount a strong rectangular frame, D, so as to be nearly balanced thereon, and so that it is free to tilt or vibrate on the axle so as to be brought to any required inclination.

On the tongue C I mount a segmental rack-bar, $a$, and on the front of the frame D I mount a pinion, $b$, gearing into rack $a$ and operated by a hand-wheel, $c$, so that, by turning this latter, the pinion is caused to travel up and down the rack, and thereby to tilt or tip the frame D upon the axle or shaft A.

As the rear end of the frame D, when certain devices are attached thereto, is much heavier than the forward end, the frame tends to fall over backward. To prevent this I attach to the side of the pinion $b$ a ratchet-wheel, $d$, and attach to the pinion-support a pawl, $e$, which engages in the ratchet-wheel and prevents the pinion from turning backward so as to let the frame tip backward.

For the purpose of locking the frame at any inclination desired, I make a series of holes, $f$, through the rack-bar $a$, and secure to the side of the pinion-support a spring arm, $g$, having at its free end a pin, $h$, which may be engaged into any one of the holes $f$.

The main frame D I make with four cross-bars, $k$, $l$, $m$, and $n$, as shown, one at each end, and one a short distance each side of the shaft A.

On each end of the axle, outside of the frame, I mount a sliding clutch, $i$, working on a feather or spline, and on the inner side of each wheel D I form corresponding teeth $j$, into which the clutch may be engaged, so as to cause the wheel to turn the shaft, either or both clutches being engaged for the purpose.

Each of these clutches is operated by a pivoted lever, $o$, on the outside of the frame, the forward end of each of said levers being connected to the outer end of a transverse rod, $p$, which may be moved laterally of the frame by means of a hand-lever, $r$, attached rigidly to the inner end, as shown in figs. 1, 2, 3, and 4.

By moving the hand-levers sidewise the clutches may be engaged and disengaged.

On the front end of the frame I secure two parallel longitudinal bars, $s$, and on each of said bars I secure a plate, $t$, having notches on its edge, into which notches the levers $r$ may be locked, so as to hold the clutches in or out of gear, as desired.

On each end of the shaft A, just within the frame, I secure rigidly a cog-wheel, $u$, as shown in figs. 1, 2, 3, 4, &c.

To the cross-bar $l$ of the frame, near each end, I attach a shaft, $v$, having a depending arm or crank, $w$, and an upright arm, $y$, to be operated by the foot of the rider.

Figure 1:
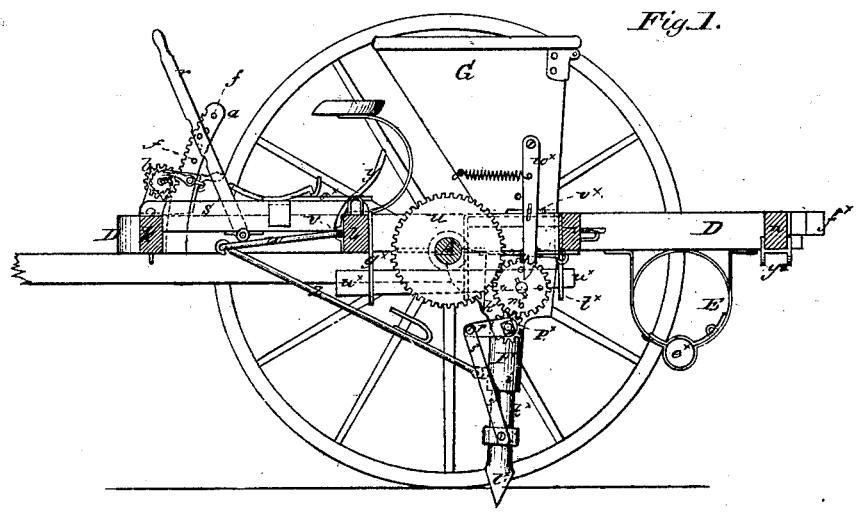
Figure 1 is a longitudinal section of my machine arranged as a corn-planter, the section being taken on the line $x\,x$ of fig. 2.

To the lower end of each arm $w$ I connect the forward end of a rod, $z$, having a hook and an eye at its back end, as shown in fig. 1, so that by pressing on arm $y$ with the foot the arm $w$ may be moved so as to move the rod $z$ backward or forward, for operating the drill-teeth, &c., as hereinafter described.

Figure 2:
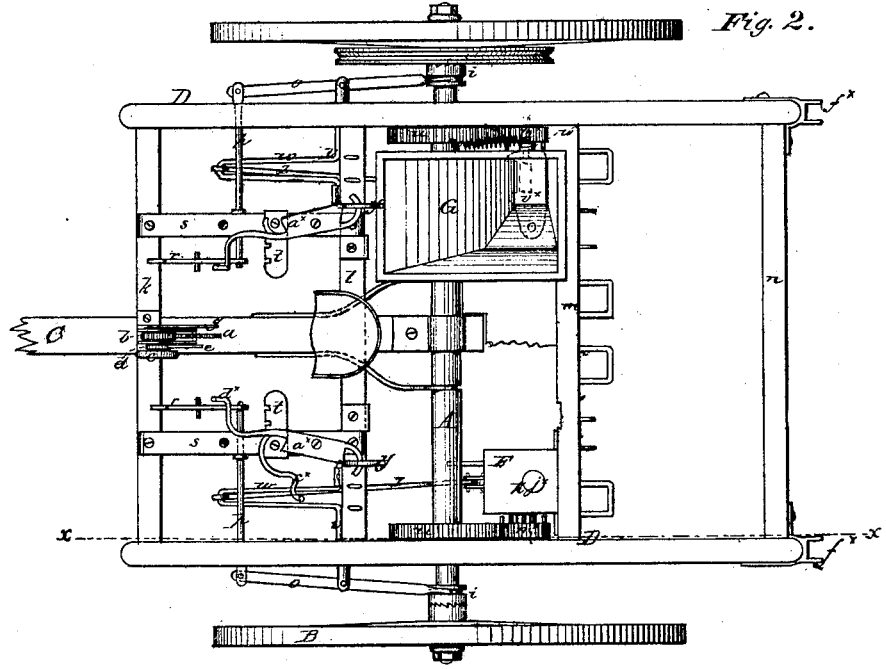
Figure 2 is a top plan view of the machine arranged as a corn-planter, but with one of the corn-hoppers removed.

On each of the longitudinal bars $s$ I pivot a plate, $a^x$, having a notch or opening, $b^x$, in its edge, near each end, and two arms $c^x$ and $d^x$, as shown in figs. 1 and 2, upon either of which the operator may place his foot for the purpose of turning the plate on its pivot.

The purpose of this plate is to lock the arm $y$ forward or backward, so as to hold the rod $z$ in the required position. They also answer other purposes, to be hereinafter described.

To each side bar of the frame, near the back end, I secure a depending bracket, E, the two being directly opposite each other, having a box, $e^x$, at its lower end, to form a bearing for one end of a shaft, as hereinafter set forth.

The upper half of the box $e^x$ I make detachable, so as to admit of the removal and insertion of the shaft.

To each rear corner of the frame I secure metal blocks $f^x$, in the manner and of the form shown in figs. 1, 2, &c.

To the cross-bars $l$ and $m$ I secure the various staples shown, and to the bar $l$ two depending plates $g^x$, having holes through their lower ends.

The various parts, combined and arranged as above described, form the main frame of my machine, to which frame I attach different special devices, according to the purpose for which the machine is to be used.

When the machine is to be converted into a corn-planter, for automatically dropping the corn in hills at certain distances apart, I attach to the frame-bar corn-hoppers and drill-tubes.

The construction of the tubes or teeth F is clearly shown in figs. 10 and 11.

They each consist of a small rectangular box or hopper, $h^x$, having a rigid tube, $i^x$, attached to the bottom, and a hole, $j^x$, made in the top, to one side of the line of the tube, so that corn dropped into the top hole, instead of falling down through the tube, will fall on the bottom of the box at one side of the tube.

The bottom of the box or hopper is inclined downward from all sides, toward the top or mouth of the tube $i^x$.

Within the tube $i^x$ is mounted another tube, $k^x$, in such manner that it may slide up and down therein; and to the lower end of this latter tube is secured a V-shaped shoe, $l^x$, having its rear side open.

On the side of the box $h^x$ is mounted a cog-wheel, $m^x$, having on its inner side a series of removable pins, $n^x$, and below this wheel is formed a journal, $o^x$, to receive a detachable pinion, $p^x$, shown in fig. 1.

This pinion gears into wheel $m^x$, and is provided with a crank, $r^x$, which may be connected by means of a pitman, $s^x$, with the movable or sliding tube $k^x$, as shown in fig. 1.

When thus connected, if the wheel $m^x$ be turned, it will operate the pinion and cause the crank and pitman to move tube $k^x$ up and down within the outer tube.

When tube $k^x$ is raised its upper end projects up within the box or hopper $h^x$, above the bottom of the same, so that corn dropped through hole $j^x$ will slide down the inclined bottom against the outside of the tube $k^x$; but when the tube is shoved down, its upper end is carried a little below the bottom of the box, and the corn thereby permitted to slide down through the tubes and out through the shoe $l^x$, at the lower end of the same.

The tubes thus constructed I hinge one under each side of the frame to the cross-bar $m$, so that the wheel $m^x$ of each tube gears into the corresponding wheel $u$ on the main axle A, so that when the axle is thrown in gear and the machine drawn forward, the tubes $k^x$ will be forced downward at regular intervals, and the shoe thrust into the ground at points equal distances apart, the two tubes $k^x$ being arranged to rise and fall together.

The tubes F are each provided with an ear on the front side, to which I connect the end of the corresponding rod $z$, so that by operating said foot-lever $y$ the tube F on that side may be turned up backward or brought down to a vertical position.

By locking the lever $y$, by means of plate $a^x$, the tooth may be held in either position, as desired.

Upon the frame I place two corn-hoppers, G, which are, for the sake of convenience, mounted on one board.

These hoppers I secure in place by placing two U-shaped metal bands $t^x$ over the board on which the hoppers sit, and then inserting long keys or bars $u^x$ through the lower ends of the bands under the frame, and through the depending arms or plates $g^x$ of cross-bar $l$, as shown in figs. 1 and 2.

In the bottom of each hopper I make a hole directly over hole $j^x$ in hopper of the tube F, so that the corn will pass down through said hole into the tube.

Over the hole I place a pivoted plate, $v^x$, which may be turned over or away from the hole; and the free side of the plate I provide with an arm, which projects out through a slot in the end of the hopper, and fits into an upright slotted lever, $w^x$, pivoted to the outside of the hopper, as shown in figs. 1 and 2.

This lever has a spiral spring so connected to it as to hold the lever back, and thereby the plate $v^x$ over the seed-passage.

The lower end of the lever projects down by the side of wheel $m^x$, so that as the latter revolves, its pins $n^x$ each strikes the arm and moves the plate $v^x$ so as to open the seed-passage to the tube F, the spring closing some when pin is past.

When the various parts are thus arranged and the machine started the operation will be as follows:

The main wheels B will turn the axle A and its wheels $u$, and each of the latter will operate the wheel $m^x$ and crank-pinion $p^x$ of the adjoining tooth, whereby the tube $k^x$ is moved up and down, and the plate $v^x$ at the same time moves, so as to open and close the seed-passage between the hopper and tube.

The parts are so arranged that the plate opens the passage and discharges corn from the hopper into the box $h^x$ of the tube F, while the tooth or tube $k$ is raised, so that when the said tube is moved down to the lowest point and its shoe forced into the ground, the corn will drop down through, as before described, and thus be deposited into the ground below the surface.

The tube then rises, corn is again discharged into the box at the top, and, the machine having proceeded forward the desired distance, the tube descends and deposits the corn for the next hill, and so on continuously.

When going to and from the field, or turning around, or when for other reasons it is not desired to have the machine plant, the levers $y$ are pressed forward, and the teeth or tubes F thereby thrown or turned up backward out of the ground, the turning back of the teeth serving to disconnect the wheels $u$ and $m^x$ from each other, and thus stop the feeding devices.

When the machine is to be converted into a corn-drill for merely opening the furrows and scattering the corn along therein, I allow the hoppers and the teeth F to remain on the machine. I however remove the crank-pinion $p^x$ and pitman $s^x$, and apply a rigid bar from the pinion-journal $o^x$ to the lower end of the movable tube, so as to hold the latter rigidly extended, as in figs. 10 and 11, so that it will enter the ground and open a continuous furrow as the machine proceeds. I also apply to the wheels $m^x$ an additional number of pins, so that the levers $w^x$ and the seed-valves connected thereto will be operated more frequently.

When the machine is put in motion it will be seen the seed-passages will be opened very often, so as to let the corn feed down from the hopper, through the tube F, into the furrows opened thereby.

The tubes may be thrown up by operating the foot-levers, in the same manner as when used for a corn-planter.

If, now, it is desired to convert the machine into a grain-drill, I disconnect the rods $z$ from the teeth F, and remove the latter and the corn-hoppers G from the frame. I then hinge to the cross-bar $l$, side by side, two sets of drill-teeth H, each set consisting of four or more teeth connected rigidly together, as in figs. 3 and 4.

Each of these teeth consists of two tubes, sliding one within the other, so that their length may be varied.

Figure 3:
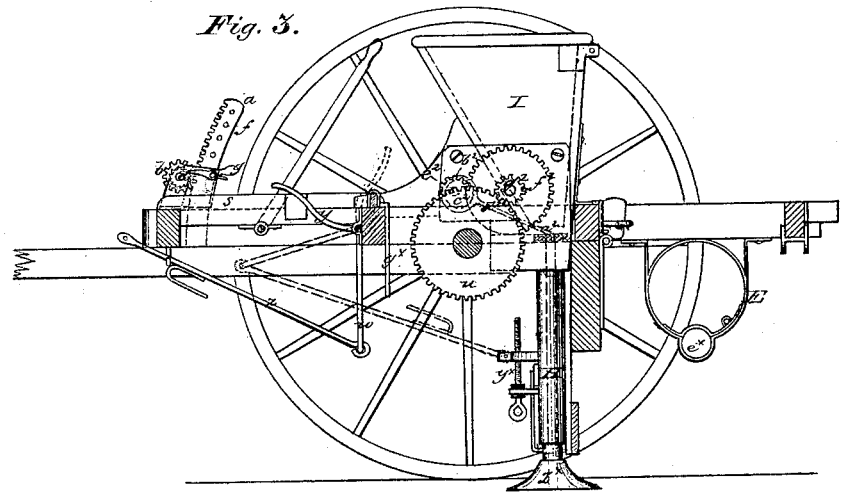
Figures 3 and 4 are respectively a longitudinal section and a top plan view of the machine, with the seed-drill attachments applied, a portion of the hopper being broken away for the purpose of exposing the drill-teeth.
Figure 4:
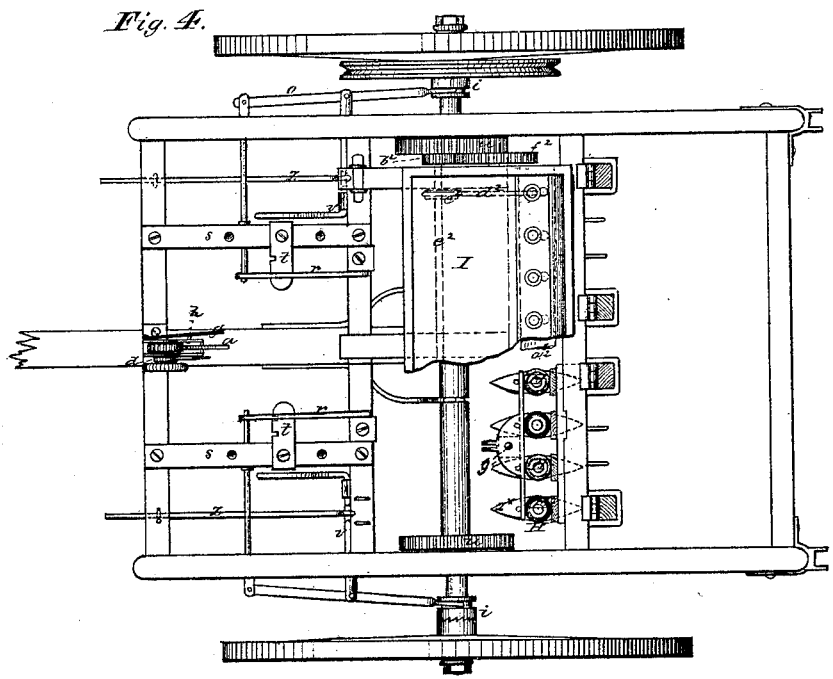

The lower sections of the teeth, which slide within the upper, I connect with each other by a cross-bar; and to this cross-bar I attach a screw-rod, $y^x$, which passes through a plate attached to the upper sections or tubes, as shown in figs. 3 and 4, so that, by turning the rod, the teeth may be lengthened or shortened, as desired.

To the lower ends of each of the teeth I secure a metal foot, $z^x$, for opening the furrow.

These feet I make flat on their under side, and pointed at both front and rear, so that, as they pass through the soil, they do not throw the same outward and leave an open furrow, but allow it to fall back and cover the seed discharged through the middle of the feet.

On the frame I mount a long seed-hopper, I, having a row of holes through its bottom; and under the hopper I place a laterally-sliding bar, $a^2$, provided with a corresponding row of holes.

The holes in the hopper-bottom are located one over each drill-tooth H, so that, when the bar $a^2$ is moved into such position that its holes coincide with those in the hopper-bottom, the seed will flow from the hopper, down through the bottom and the slide, into the teeth below, and through the teeth into the furrows.

Across the front of the hopper I mount a horizontal shaft, $e^2$, having on its ends pinions $b^2$, and also inside of the pinions eccentrics $c^2$, which latter are connected, by yokes and pitmen $d^2$, with the respective ends of the slide or bar $a^2$. Thus, when the shaft $e^2$ is turned, its eccentrics slide the bar $a^2$ forward and backward under the hopper, and alternately open and close the seed-passages.

On each end of the hopper I mount a wheel, $f^2$, gearing into the adjoining pinion of the eccentric-shaft $e^2$; and to the side of each of these wheels I secure a pinion, $g^2$, gearing into the adjoining wheel $u$ of the main shaft A.

It will thus be seen that, as the machine proceeds, motion will be transmitted through the gearing to the eccentrics, and from the latter to the slide or bar $a^2$, which is constantly opening and closing the seed-passages, and that, therefore, as the teeth H open furrows, seed will be discharged with regularity and uniformity into the same.

I connect one of the rods $z$ with each set of teeth, so that, by operating the foot-levers $y$, the teeth may be turned up backward when necessary, or held down in place by locking levers $y$ by plates $a^x$.

The depth to which the teeth enter the ground may be regulated by adjusting the screw $y^x$.

Figure 5:
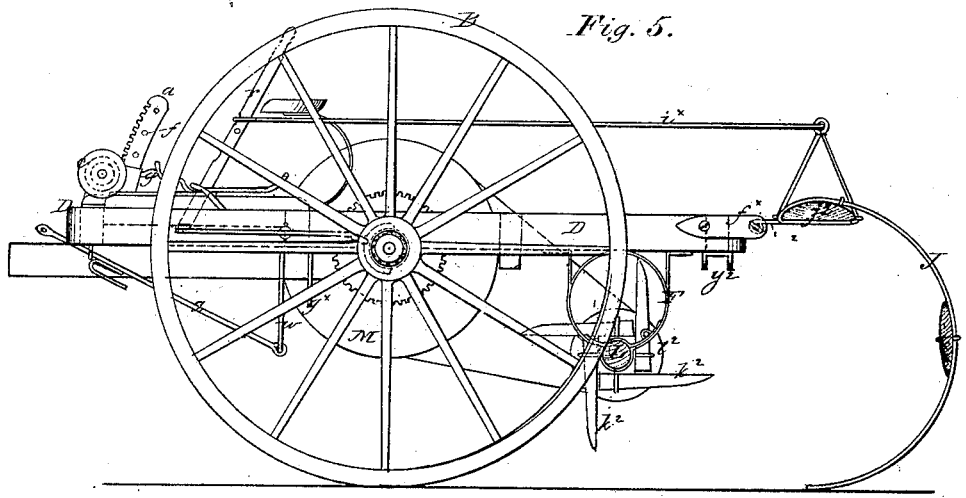
Figures 5 and 6 are respectively a side elevation and a top view of the machine, with both the tedder and hay-rake applied, it being, of course, understood that this is done for the sake of illustration merely, and that, in practice, one is applied to the exclusion of the other.
Figure 6:
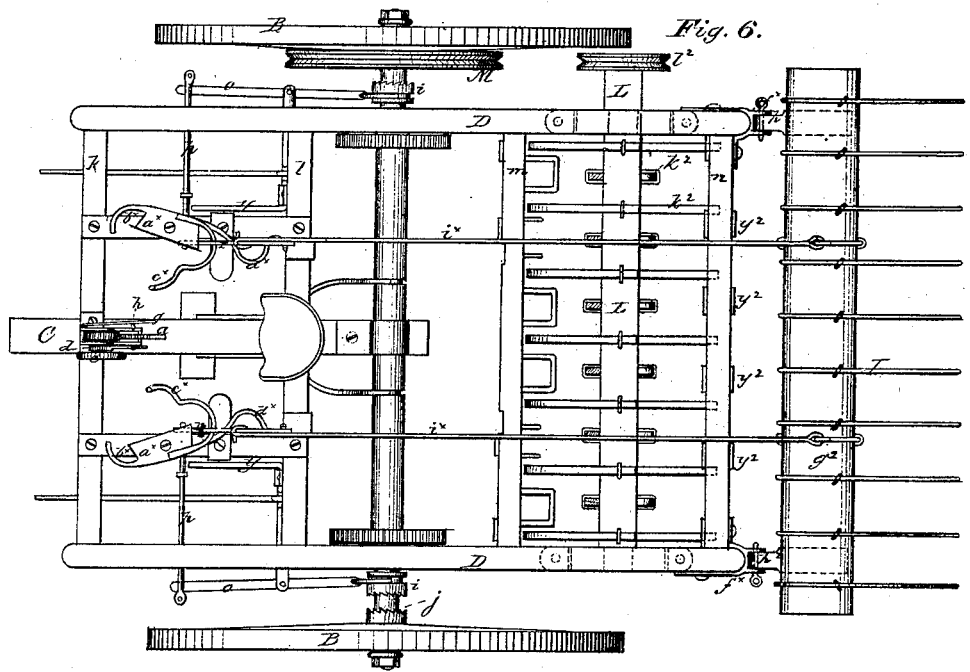

If, now, it is desired to transform the machine into a hay-rake, I remove the seed-hopper and the drill-teeth, and turn the rods $z$ forward, and support them on hooks provided for the purpose at the front of the frame, as shown in figs. 5 and 6. I also disconnect the rods $p$ from the clutch-levers $o$, so that the hand-levers $r$ may be turned forward and backward. I also detach the plates $a^x$, turn them end for end, and place each one on the opposite bar $s$ at a point further forward than it previously occupied. I then provide a rake, J, consisting of a series of curved wire teeth attached to a bar, $j^2$, which latter has two eye-blocks, $h^2$, attached to its front edge. This rake I connect to the rear end of the frame by inserting the eye-blocks $h^2$ into the blocks $f^x$, by passing pins through them, as shown.

To the cross-bar $g^2$ of the rake I secure two upright arms, and each of the arms I connect, by means of a rod, $i^2$, with the corresponding hand-lever $r$ at the front of the frame, so that, by the joint action of both or separate action of either of these levers the rake-teeth may be raised from the ground.

When traveling about with the machine, the levers $r$ may be locked forward by plates $a^x$, so as to hold the rake up.

To change the machine to a hay-tedder, I detach the rake J and its rods $i^2$, and in the brackets F I mount a horizontal shaft, L, having a series of tangential arms, $k^2$, attached to it, as in figs. 5 and 6.

On one end of this shaft a pulley, $l^2$, is secured, and this pulley I connect, by means of a belt, with a large pulley, M, attached to the inside of one of the main wheels B, so that, as the latter turns, it serves to give a rapid rotary motion to the shaft and its arms. The arms, entering the grass or hay, toss the same upward, and turn it over and scatter it evenly upon the ground.

The tedder-shaft may be raised or lowered, as desired, by changing the inclination of the frame, which is done by operating the hand-wheel at the front, as hereinbefore described.

To convert the machine into a gang-plow I detach and remove the tedder-shaft and belt, and suspend from the rear cross-bar of the frame six standards, M, as shown in fig. 7, each having a plow attached to its lower end. The manner in which the standards are attached to the bar is clearly shown in fig. 7.

To the bar, at equal distances apart, are attached six metal blocks, $y^2$, said blocks each having a transverse flange or lip on the front and rear side.

To the upper end of each standard a block, $m^2$, is so hinged as to let the standard swing forward and backward when the block is stationary.

This block $m^2$ is inserted between the flanges of blocks $f^x$, and secured by a pin, so as to allow the block $m^2$ and its standard to swing laterally.

When using the apparatus as a gang-plow, it is necessary to hold the plows very rigidly, and I therefore attach to the standards two bars across each other, so as to hold the six standards firmly together and prevent any lateral movement, while, at the same time, the gang is permitted to swing freely backward and forward. I also turn down the rods $z$ from their supports, and connect them, by chains $n^2$, with the plow-standards, so that, by operating said rods by means of the levers, $y$, the plows may be brought down into position to operate, or turned up forward out of the ground.

The plows may, of course, be held forward by fastening the foot-levers by means of the pivoted plates $a^x$, before described.

Chains may also be connected from the plows forward to the cross-bar $m$ of the frame, so as to relieve the foot-levers $y$ from the backward strain of the plows when in operation.

As the machine advances the plows open six adjoining furrows in the usual manner. The depth of the furrows may be varied by tilting the frame more or less, whereby the plows may be raised or lowered.

The plows, instead of being rigidly attached to the standards, are pivoted thereto, as shown in fig. 7, so that plow-points may be thrown up or down, as occasion may require.

For the purpose of securing the plow in different positions, I pivot to its front end a bar, $o^2$, having a series of holes in its upper end, through either of which a pin may be inserted into a hole in the standard.

If, now, it is desired to change the machine into a double-row cultivator or corn-plow, I first remove all the plows, and then attach to the under side of the rear bar of the frame a long bar, $p^2$, having four metal blocks, $r^2$, attached to it, two at the middle and one at each end, as shown in fig. 9. I then take four of the plows M, two right and two left-handed, and attach them to the blocks $r^2$ of bar $p^2$, in the manner shown in figs. 7, 8, and 9, so that the middle plows throw their furrows outward and the outer plows their furrows inward, as in fig. 9. I then connect the four plows by cross-bars, so that they cannot swing laterally, and also connect them, by chains, with rods $z$, so that they can be moved forward and back by the foot-levers $y$. The whole, thus arranged, forms an ordinary corn-cultivator, which will hill up on both sides of two rows at the same time.

The machine may be changed into a potato-digger by detaching the plows as used for a cultivator, and attaching to each rear corner two plows close together, and arranged to throw their furrows outward from each other. As the machine is carried forward each pair of plows will run under or through a row and turn the potatoes out to the surface. In this way I produce a very efficient machine, which opens two rows at the same time.

When the machine is used as a potato-digger or a cultivator the depth to which the plows cut may be regulated by tilting the frame in the same manner as with the gang-plow.

Having thus described my invention,

What I claim is—

The combined implement, consisting of the frame D, mounted on wheels centrally, and made adjustable on its axle, said frame being provided with the brackets E, stirrups $f^x$ and $y^2$, and bars $l$ and $m$, for attaching and operating its various attachments, substantially as described.

CHARLES R. RAND.

Witnesses:
  PHIL. T. DODGE,
  HARRY KING.